United States Patent [19]
Yang

[11] Patent Number: 5,785,264
[45] Date of Patent: Jul. 28, 1998

[54] PEPPER GRINDER

[76] Inventor: Heng-Te Yang, P.O. Box 90, Tainan City 704, Taiwan

[21] Appl. No.: 845,164

[22] Filed: Apr. 21, 1997

[51] Int. Cl.⁶ ............................................... A47J 42/00
[52] U.S. Cl. ............................................... 241/169.1
[58] Field of Search ........................ 222/142.1–142.7; 241/169.1, 259.1, 168

[56] References Cited

U.S. PATENT DOCUMENTS

| | | | |
|---|---|---|---|
| 3,827,641 | 8/1974 | Andersson | 241/169.1 |
| 4,632,322 | 12/1986 | Beilstein | 241/169.1 |
| 5,145,119 | 9/1992 | Lowe | 241/169.1 |
| 5,651,506 | 7/1997 | Hockey | 241/169.1 |

*Primary Examiner*—Mark Rosenbaum

[57] ABSTRACT

A pepper grinder includes an outer housing, an inner housing, a grind unit and a base unit. The outer housing receives the inner housing and stores a condiment in an inner space. The inner housing receives pepper grains to be ground. The base unit has a lower chamber for containing the grind unit therein. The grind unit consists of a grind base unit, a grind body, a rod shaft, a spring, and an adjust ring. The outer housing is fixed and rotates with the grind base unit and the base is fixed and rotates with the grind body so that the outer housing and the base unit may be rotated in opposite directions so that the grind base unit and the grind body rotate in opposite directions to grind pepper grains falling between them.

10 Claims, 5 Drawing Sheets

1

PEPPER GRINDER

BACKGROUND OF THE INVENTION

This invention relates to a pepper grinder, particularly to one provided with an inner housing for containing pepper grains to be ground and convenient for filling in pepper grains, and with an outer housing made transparent for the inner housing visible from outside for storing any other condiment to be used with pepper.

As western foods have been widely introduced to the Eastern cuisine, condiments have also been commonly accepted during meals. And pepper grinders ready for use has also been growing popular in restaurants, with many kinds of them being in use and on markets. Some of them are not so convenient for filling pepper grains, others are only used for one purpose, i.e. to grind pepper only.

SUMMARY OF THE INVENTION

One purpose of the invention is to offer a pepper grinder with an aesthetic appearance of three dimensions.

Another purpose of the invention is to offer a pepper grinder that is simple to operate.

One more purpose of the invention is to offer a pepper grinder with the additional function of storing another kind of condiment to be used with the grand pepper.

One feature of the invention is an outer housing having an inner space for storing a condiment and for containing an inner housing receiving therein pepper grains to be ground.

Another feature of the invention is the inner housing of an elongate cone shape visible from outside of the outer housing so as to show an aesthetic appearance of the grinder.

Another feature of the invention is a grind unit consisting of a grind base unit, a grind body, a spring, a rod shaft, and an adjust ring. The rod shaft has a distal round portion fitting with the grind base unit, an intermediate portion of a square cross-section engaging a center square hole of the grind body, and a proximate threaded portion to screw with an adjust ring. The distal portion is combined with a bottom disc welded with the bottom of the outer housing so that the outer housing and the grind body are fixed indirectly together to rotate together.

Another feature of the invention is a base unit having a lower chamber opening to a lower end for containing the grind unit therein, and a center hole through an upper flat wall separating the lower chamber from an upper inner space. The base unit is combined revolvable with the outer housing and fixed with the grind base unit so that the base unit and the grind base rotate together. Then the outer housing and the base unit can be rotated in opposite direction manually, and thus the grind base unit and the grind body are rotated in the opposite direction thereby to grind pepper grains falling down from the inner housing to the upper inner space of the base unit the aperture between the grind base unit and the grind body can be reduced or increased by screwing the adjust ring up or down with the rod shaft to adjust the size of ground pepper.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
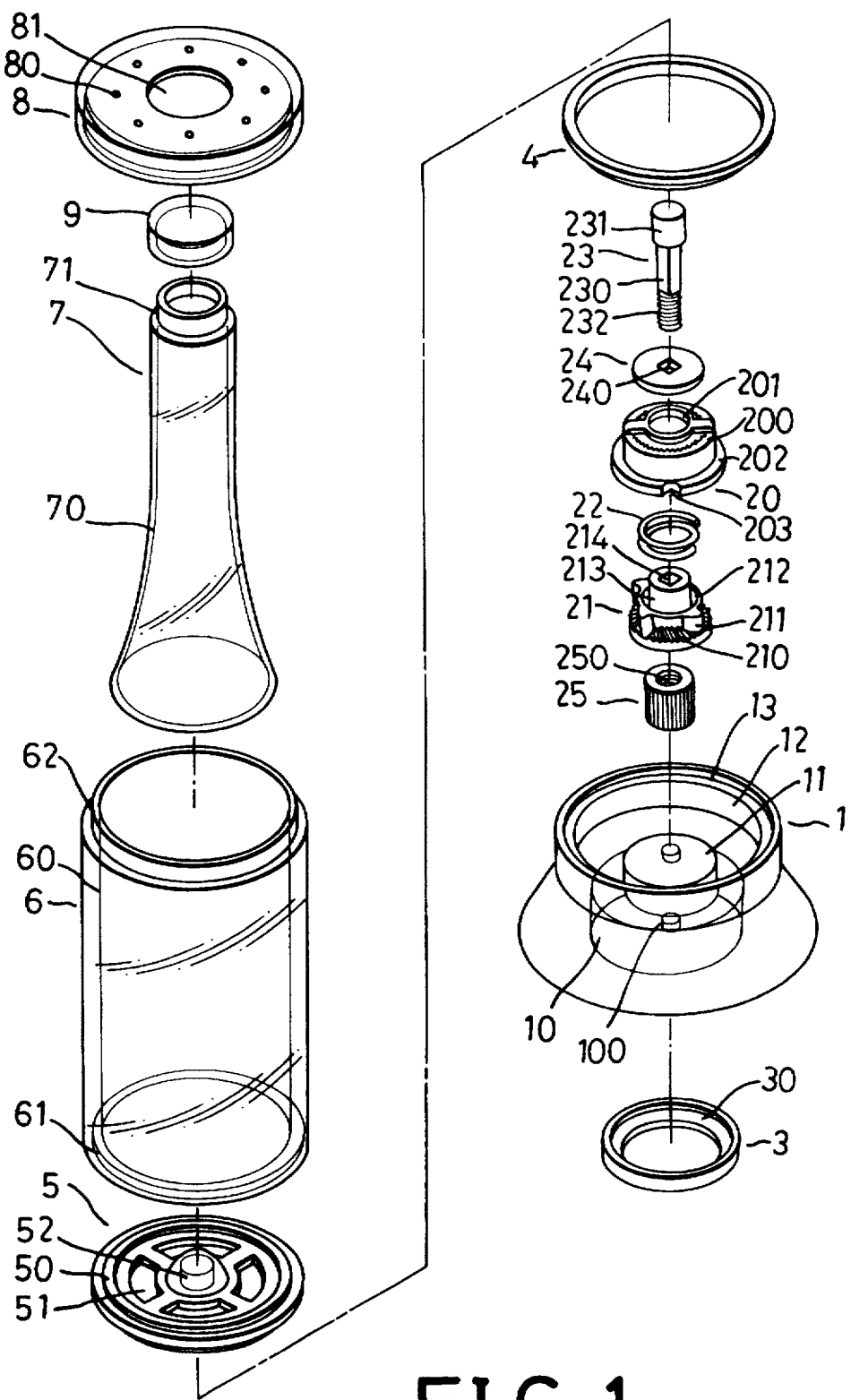
FIG. 1 is an exploded perspective view of a preferred embodiment of a pepper grinder in the present invention.
Figure 2:
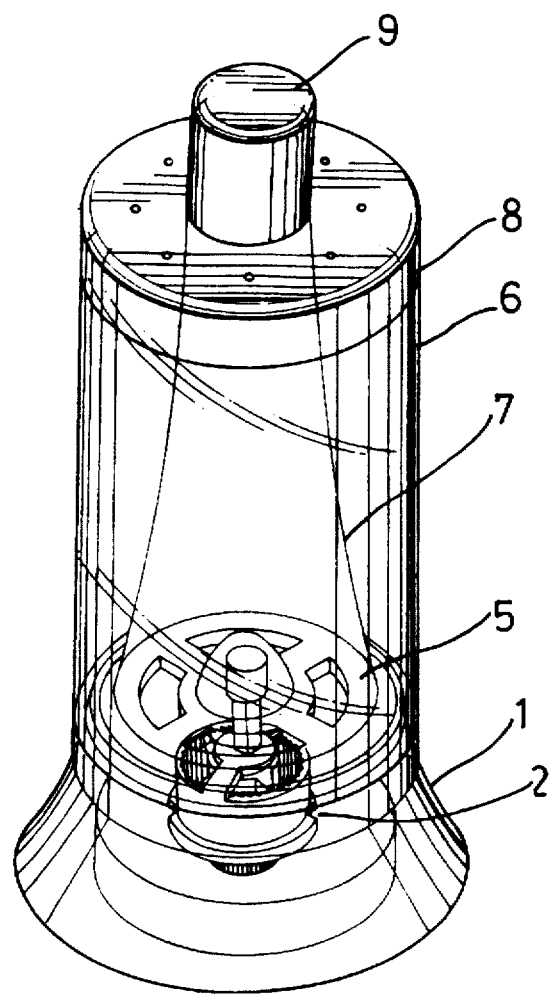
FIG. 2 is a perspective view of the preferred embodiment of a pepper grinder in the present invention.
Figure 3:
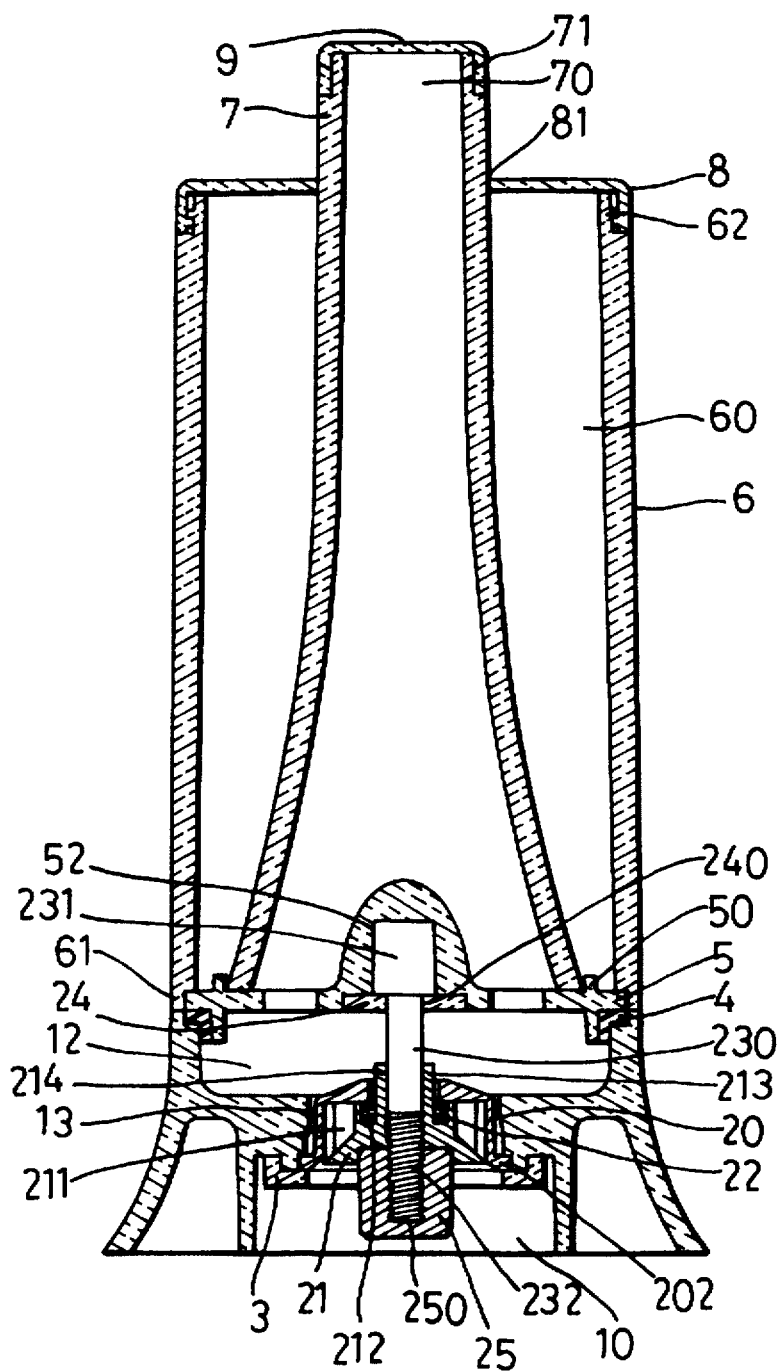
FIG. 3 is an enlarged cross-sectional view of the preferred embodiment of a pepper grinder in the present invention.

A preferred embodiment of a pepper grinder in the present invention, as shown in FIGS. 1–3 includes a base unit 1, a grind unit 2, a fix ring 3, a gasket 4, a bottom disc 5, an outer housing 6, an inner housing 7, an outer cap 8 and an inner cap 9 combined together.

The base unit 1 has a lower cylindrical chamber 10 opening to a lower end, two opposed stops 100, 100 on an upper surface of an upper flat wall defining the lower chamber 10, a center hole 11 in the upper flat wall, and an upper inner space 12 opening to an upper end.

The grind unit 2 is contained in the lower chamber 12 and the hole 11 of the base unit 1, consisting of a grind base unit 20, a grind body 21, a spring 22, a rod shaft 23, a fix disc 24, and an adjust ring 25.

The grind base unit 20 has a hollow interior, a teeth body 200 extending lengthwise upward, a shaft support 201 formed diametrically above the teeth body 200, an annular contact edge 202 in a lower end, two opposite stop notches 203, 203 in the annular contact edge 202 to engage the two opposed stops 100, 100 of the base unit 1. Then the base unit 1 and the grind base unit 20 can be rotated together manually in grinding pepper grains.

The grind body 21 is to be fitted in the hollow interior of the grind base unit 20, having a set of annular teeth 210 on an upper surface of a lower end thereof, a plurality of moving teeth 211 spaced equidistantly around on the annular teeth 210, an annular spring groove 212 opening to an upper side, a projecting shaft 213 defined by the groove 212 and having a center square hole 214, and a spring 22 fitted in the spring groove 212.

The rod shaft 23 fits through the grind base unit 20 and the grind body 21, having an intermediate portion 230 of a square cross-section, a distal portion 231 of a round shape, and a proximate portion 232 of male threads.

The fix disc 24 has a center square hole 240 for the rod shaft 23 to extend therein and fitting around the intermediate portion 230, positioned firmly in the bottom disc 5.

The adjust ring 25 has female threads 250 to screw with the male threads 232 of the rod shaft 23 so as to reduce or increase an aperture between the grind base unit 20 and the grind body 21 so as to adjust the size of ground pepper.

The fix ring 3 has an inner contact edge 30, combined in the lower chamber 10 of the base unit 1 for engaging the grind base unit 20 and securing same to the base unit 1.

The gasket 4 fits around the contact edge 13 of the base unit 1, supporting the bottom disc 5 on the base unit 1.

The bottom disc 5 has an annular flange 50 on an upper surface and a plurality of holes 51 spaced equidistantly apart around inside the flange 50, and a combine hole 52 for the distal portion 231 of the rod shaft 23 to fit therein, and disc 5 being engaged on the gasket 4.

The outer housing 6 is shaped cylindrical, having an inner space 60, an annular contact edge 61 in a lower end to contact the flange 50 of the bottom disc 5, and an annular contact edge 62 defining an upper mouth.

The inner housing 7 is located in the inner space 60 of the outer housing 6 and protrudes up through the upper mouth of the outer housing 6, and fixed firmly with the bottom disc 5, having a curved cone shape, an inner space 70 and an annular contact upper edge 71.

The outer cap 8 closes up the upper mouth of the outer housing 6, fitting around the annular upper edge 62, having a plurality of small holes 80 spaced equidistantly apart around an upper intermediate surface and a center hole 81 fitted with an upper edge 71 of the inner housing 7.

The inner cap 9 closes on the annular edge 71 of the inner housing 7.

In assembling, referring to FIGS. 2 and 3, firstly the rod shaft 23 is combined with the bottom disc 5, with the distal portion 231 fitting in the center hole 52. Then the intermediate portion 230 of the rod shaft 23 is made to fit in the square hole 240 of the fix disc 24, with the fix disc 24 contacting the lower end of the distal portion 230 and the bottom surface of the bottom disc 5 and then welded with high frequency so as to fix the rod shaft 23 firmly with the bottom disc 5. Next, the outer housing 6 is placed on the bottom disc 5, with the contact edge 61 contacting the outer circumference of the bottom disc 5. Then the inner housing 7 is inserted in the inner space 60 of the outer housing 6 with its bottom edge contacting an inner side of the annular edge 50 of the bottom disc 5, and welding the contact lines of the outer housing 6, the inner housing 7 and the bottom disc 5 all together by means of high frequency. After that, the grind base unit 20 is inserted from under the base unit 1 into the top of the lower chamber 10, with the opposed stops 100, 100 engaging the stop notches 203, 203 so as to enable the base unit 1 and the grind base unit 20 do rotate together. Then the fix ring 3 is put from under the base unit 1 to fit together with the grind base unit 20, with the contact edge 30 contacting the bottom of the contact edge 202, with the upper edge of the fix ring 3 contacting the upper surface of the lower chamber 10 and then welding same together with high frequency, thereby firmly fixing the grind base unit 20 with the base unit 1 firmly. Then the gasket 4 is placed on the contact edge 13 of the base unit 1, with the rod shaft 23 of the grind unit 2 extending through the upper space 12 of the base unit 1 and the shaft support 201 of the grind base unit 20. Further, the spring 22 is fitted in the spring groove 212 of the grind body 21, with an upper end contacting the bottom of the shaft support 201 of the grind base unit 20, and with the intermediate portion 230 of the rod shaft 23 extending in the square hole 214 of the projecting shaft 213 of the grind body 21. Then the adjust ring 25 is screwed with the threads of the proximate portion 232 of the rod shaft 23, preventing the grind body 21 from separating from the rod shaft 23. Lastly, the outer cap 8 is closed on the upper contact edge 63 of the outer housing 6, with the center hole 81 passed through by the upper end portion of the inner housing 7, and with the inner cap 9 closing on the upper contact edge 71 of the inner housing 7. Then assemblage of the pepper grinder in the invention is finished.

Figure 4:
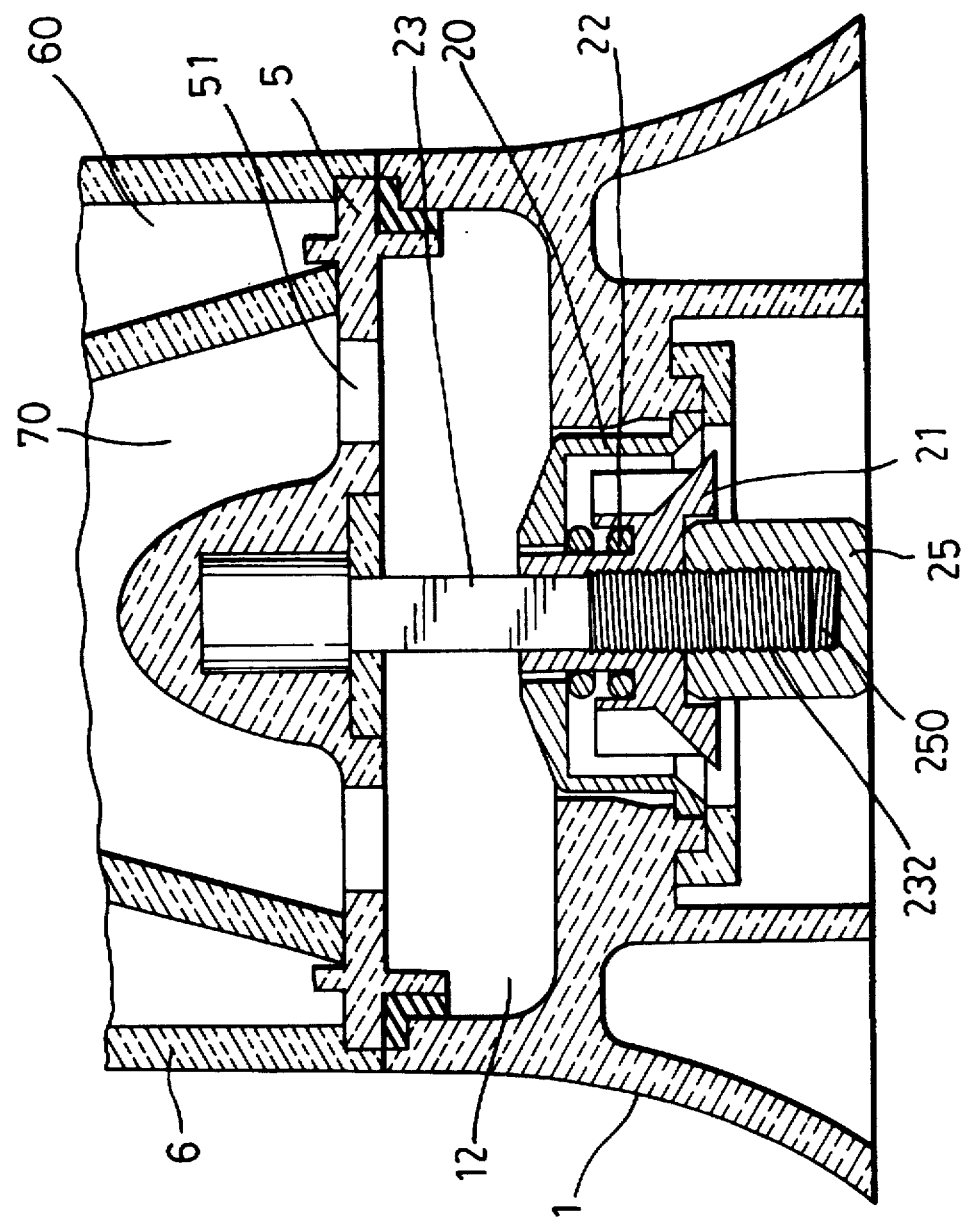
FIG. 4 is a partial enlarged cross-sectional view of a grind unit of a pepper grinder in the present invention; and, FIG. 5 is a perspective view of the preferred embodiment of a pepper grinder in the present invention showing how it is rotated for grinding pepper.
Figure 5:
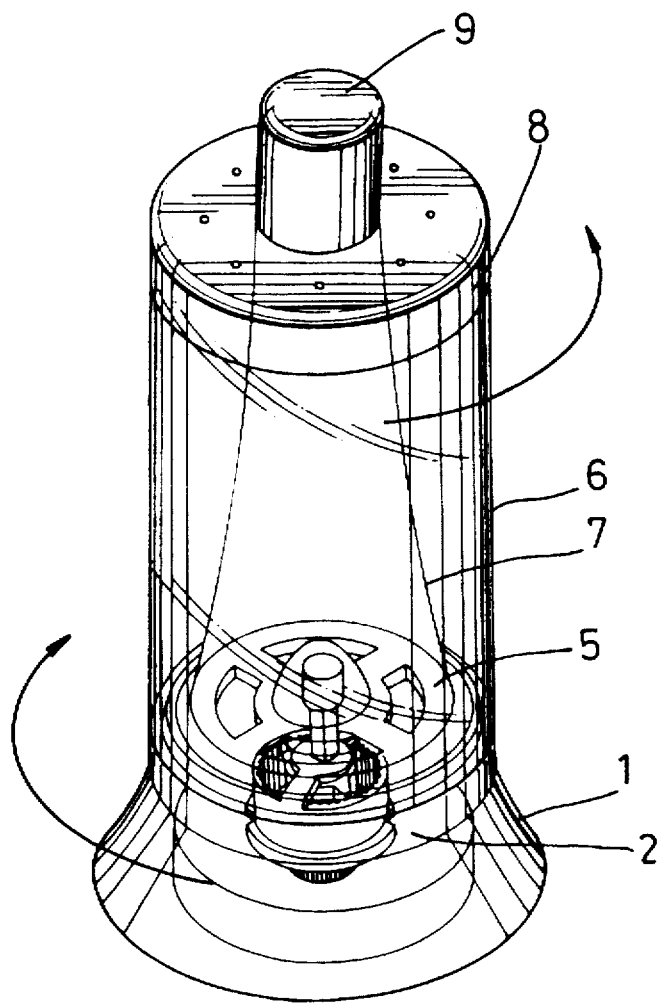

In using, referring to FIGS. 4 and 5, pepper grains drop through the inner cap 7 into the inner space 70 of the inner housing 7 and on the bottom disc 5. Then they will drop through the holes 51 into the upper space 12 of the base unit 1 and into an aperture between the grind base unit 20 and grind body 21. Then, the outer housing 6 is held with one hand, and the base unit 1 is held and rotated clockwise with the other hand, with the outer housing 6 rotating the bottom disc 5, which then rotates the rod shaft 23. So the rod shaft 23 rotates the grind body 21. Then the grind body 21 and the grind body are rotated in opposite direction to each other.

Then pepper grains are ground between the teeth body 200 of the grind base unit 20 and teeth 210 of the grind body 21 and the moving teeth 211, with the adjust ring 25 rotated to move the grind body 21 up or down for adjusting the aperture between the grind base unit 20 and the grind body 21 so that the size of ground pepper may be controlled thereby. In addition, the inner space 60 of the outer housing 6 can receive salt or any condiment therein so that the condiment stored therein can be shaken out of the small holes 80 of the outer cap 8 by turning upside down the outer housing 6 when the pepper grinder is not in use. The outer housing 6 is preferably made transparent, permitting the inner housing 7 to be visible from outside, and presenting an aesthetic effect three dimensional effect.

As can be understood from the above description, the pepper grinder of the invention has the following advantages. 1. Only the inner cap is taken off for putting in pepper grains into the inner housing for grinding them, thus very convenient to operate. 2. Salt or any other condiment can be stored in the outer housing so as to be used after pepper is ground, thus easy to use two kinds of condiments at the same time. 3. The contents in the outer housing is visible,thus forming an aesthetic three dimensional effect.

While the preferred embodiment of the invention has been described above, it will be recognized and understood that various modifications may be made therein and the appended claims are intended to cover all such modifications which may fall within the spirit and scope of the invention.

What is claimed is:

1. A pepper grinder comprising:

a) a base unit unit including a cylindrical chamber formed therein, the chamber having a lower open end and a center hole in an upper flat wall defining the chamber;

b) a grind unit disposed within the chamber, the grind unit including a grind base having a hollow interior, a grind body disposed within the hollow interior, a spring having a first end engaging the grind body and a second end engaging the grind base unit, a fix disc, a rod shaft inserted through the fix disc, grind body and grind base unit, and an adjust ring threadedly secured to a lower end of the rod shaft;

c) a fix ring engaging the grind base unit and securing same to the base unit unit;

d) a gasket disposed on an upper side of the base unit unit;

e) a bottom disc secured to the fix disc and an upper end of the rod shaft, the bottom disc being engaged on the gasket and including an annular flange and a plurality of spaced holes for the passage of pepper grains therethrough;

f) an outer cylindrical-shaped housing having an inner space, an upper mouth and a lower end, the lower end being supported on the bottom disc;

g) an inner housing disposed within the inner space of the outer housing and including an upper mouth extending beyond the upper mouth of the outer housing, an inner space, and a bottom end secured to the bottom disc;

h) an outer cap releasably closing the upper mouth of the outer housing, the outer cap including a center hole through which the upper end of the inner housing extends and a plurality of secondary holes formed therein for permitting contents stored in the inner space of the outer housing to be passed therethrough when the outer housing is turned upside down; and i) an inner cap releasably closing the upper mouth of the inner housing.

2. The pepper grinder of claim 1 wherein the chamber of the base unit unit includes a pair of opposed stops at opposite sides of the upper flat wall, the grind base unit includes a lower flange supported on a surface of the chamber, and the grind base unit including an annular contact edge having a pair of opposed notches for engaging the opposed stops of the lower chamber to permit the grind base unit to rotate with the base unit unit.

3. The pepper grinder of claim 1 wherein the upper side of the base unit unit includes an annular circumferential edge and the gasket being disposed on the edge.

4. The pepper grinder of claim 1 wherein the bottom disc further includes a center hole, the rod shaft including a distal round portion and an intermediate square portion, the distal round portion being engaged through the center hole and the intermediate square portion being engaged through a square hole of the fix disc, and the fix disc being welded to the bottom disc for securing the rod shaft to the bottom disc.

5. The pepper grinder of claim 1 wherein the bottom disc further includes an annular flange on an upper surface thereof, the annular flange being engaged by the bottom end of the inner housing.

6. The pepper grinder of claim 1 wherein the outer housing includes an annular contact surface disposed in the engagement with an annular circumferential edge of the bottom disc.

7. The pepper grinder of claim 1 wherein the inner housing, outer housing and bottom disc have a plurality of contact edges secured together by high frequency welding.

8. The pepper grinder of claim 1 wherein the fix ring includes an annular inner edge disposed in engagement with a bottom surface of a flange of the grind base unit and a top edge welded to an upper surface of the chamber for securing the grind base unit to the base unit unit.

9. The pepper grinder of claim 1 wherein the outer housing includes an upper annular edge disposed in engagement with the outer cap for closing the upper mouth of the outer housing, and a plurality of holes formed in the outer cap for dispensing a condiment stored in the inner space of the outer housing.

10. The pepper grinder of claims 1 wherein the inner housing includes an upper annular edge disposed in engagement with the inner cap for closing the upper mouth of the inner housing.

* * * * *